United States Patent
Sun et al.

(10) Patent No.: US 11,187,662 B2
(45) Date of Patent: Nov. 30, 2021

(54) DEVICE AND METHOD FOR SIMULTANEOUSLY INSPECTING DEFECTS OF SURFACE AND SUBSURFACE OF OPTICAL ELEMENT

(71) Applicant: ZHEJIANG UNIVERSITY, Zhejiang (CN)

(72) Inventors: Anyu Sun, Zhejiang (CN); Zhihong Li, Zhejiang (CN); Bingfeng Ju, Zhejiang (CN); Chuanyong Wang, Zhejiang (CN); Xiaoyu Yang, Zhejiang (CN); Zeqing Sun, Zhejiang (CN); Huilin Du, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 16/960,063

(22) PCT Filed: Aug. 2, 2019

(86) PCT No.: PCT/CN2019/098995
§ 371 (c)(1),
(2) Date: Jul. 3, 2020

(87) PCT Pub. No.: WO2020/098314
PCT Pub. Date: May 22, 2020

(65) Prior Publication Data
US 2021/0055230 A1    Feb. 25, 2021

(30) Foreign Application Priority Data
Nov. 13, 2018    (CN) .......................... 201811343299.5

(51) Int. Cl.
*G01N 21/88*    (2006.01)
*G01N 21/17*    (2006.01)
*G01N 21/49*    (2006.01)

(52) U.S. Cl.
CPC ..... *G01N 21/8806* (2013.01); *G01N 21/1702* (2013.01); *G01N 21/49* (2013.01);
(Continued)

(58) Field of Classification Search
CPC ............ G01B 21/8806; G01B 21/1702; G01B 21/49; G01N 2021/1706; G01N 2201/06113
See application file for complete search history.

(56) References Cited

U.S. PATENT DOCUMENTS

| | | | | |
|---|---|---|---|---|
| 5,486,919 A * | 1/1996 | Tsuji | ...................... | G01N 21/88 356/237.4 |
| 2004/0095573 A1* | 5/2004 | Tsai | ................... | G01N 21/9501 356/237.5 |

(Continued)

FOREIGN PATENT DOCUMENTS

CN    202453298 U    *    9/2012

OTHER PUBLICATIONS

English Machine translation of CN-202453298-U (Year: 2012).*

*Primary Examiner* — Dominic J Bologna (57) ABSTRACT

A device and a method for simultaneously inspecting defects of a surface and a subsurface of an optical element are provided. Combined with laser-induced ultrasound and laser scattering inspection technologies, through generating acoustic sound waves on the surface and the subsurface of the optical element to be tested by lasers, a static light scattering effect of subsurface defects under modulation of the acoustic sound wave is observed and analyzed; through analyzing amplitude and phase changes of scattered light intensity and reflected light intensity, inspection for the defects of the surface and the subsurface of the optical element is realized. The present invention can be applied in quality inspection of precise optical elements, especially in (Continued)

finished product inspection of ultra-precise optical elements having strict requirements on the subsurface defects.

6 Claims, 3 Drawing Sheets

(52) U.S. Cl.
CPC ............... *G01N 2021/1706* (2013.01); *G01N 2201/06113* (2013.01)

(56) References Cited

U.S. PATENT DOCUMENTS

| | | | |
|---|---|---|---|
| 2012/0154806 A1* | 6/2012 | Brunfeld | G01B 11/0608 356/369 |
| 2015/0015893 A1* | 1/2015 | Nakahira | G01N 21/88 356/495 |
| 2020/0124977 A1* | 4/2020 | D'Achard Van Enschut | G03F 1/84 |

* cited by examiner

FIG. 1

Left View

FIG. 2 (a)

Top View

DEVICE AND METHOD FOR SIMULTANEOUSLY INSPECTING DEFECTS OF SURFACE AND SUBSURFACE OF OPTICAL ELEMENT

BACKGROUND OF THE PRESENT INVENTION

Field of Invention

The present invention relates to a nondestructive inspection technology, and more particularly to a device and a method for simultaneously inspecting defects of a surface and a subsurface of an optical element. The present invention can be applied in quality inspection of precise optical elements, especially in finished product inspection of ultra-precise optical elements having strict requirements on subsurface defects.

Description of Related Arts

The technological developments of the fields such as high-precision optical system, high-performance laser weapons and inertial confinement laser fusion system around the world raise the unprecedented strict requirements on the damage resistance ability of the optical elements. The surface/subsurface damages introduced during the manufacturing process influence the damage sensitivity of the optical elements from three aspects respectively of light field strengthening caused by the interference, enhanced laser absorption ability of the optical material by the cracks and impurities, and decrease of the material mechanical property, further causing the macroscopic damages of the optical elements. Currently, the evaluation technology for the surface quality of the optical elements is relatively mature. However, the inspection and evaluation technologies for the subsurface defects are still not complete. The minor damages hidden 1-100 μm below the surface directly decrease the property and service life of the optical material and cause the irreversible damages to the elements. Thus, the subsurface defects of the optical elements are considered as the most critical factor of inducing the laser damages by the academic and industrial circles.

Some of the foreign researchers and scholars established a new method for inspecting the subsurface damages of the optical elements based on the light scattering principle. For example, American Fine K et al. measured the position and size of the surface/subsurface defects of the optical elements with utilizing the laser scanning microscopic method; American Argonne National Laboratory proposed the confocal scanning microscopic detection technology based on the polarized light scattering, trying to solve the inspection problem of the subsurface defects of the advanced ceramics; when researching the subsurface damage inspection of the single crystal silicon, Zhang J M et al. obtained the submicron-scale resolution with the laser scanning microscopic method, deeply researched the related theory of the scattered light propagation characteristics, and measured the subsurface damages of the silicon wafers and the advanced ceramics; Trost M et al. conducted the quantitative analysis for the subsurface damages with the improved data processing method, so that the nondestructive quantitative inspection of the subsurface damages becomes possible. The above researches proved the possibility of inspecting the subsurface damages of the optical elements with the light scattering method.

However, the current technologies have deficiencies as follows. (1) The current inspection methods are only the static observation of the defect positions within the limited time, whose sensitivity and precision on the subsurface defects are generally poor. (2) The current technologies adopt the single scattered light collection and analysis means to analyze the scattering effects of different defects, which fails to evaluate the dynamic changes of the defects in motion.

The subsurface defects of the ultra-precise optical elements are the key factors of influencing the optical property and service life thereof. The generation of the subsurface defects is brought by the optical cold treatment process such as cutting, grinding and polishing of the optical elements, and the damage morphology is closely correlated to the treatment process. In order to effectively control the processing quality of the ultra-precise optical elements, the inspection of the subsurface defects is necessary. However, at present, there are few effective nondestructive inspection methods.

Aiming at the above demands, a device and a method for simultaneously inspecting the defects of the surface and the subsurface of the optical element are provided by the present invention. Through generating the surface waves on the surface and the subsurface of the optical element to be tested by the lasers, the static light scattering effects of the subsurface defects under the modulation of the surface waves are observed and analyzed, so as to realize the inspection of the defects of the surface and the subsurface of the optical elements.

SUMMARY OF THE PRESENT INVENTION

Aiming at deficiencies in prior art, an object of the present invention is to provide a device and a method for simultaneously inspecting defects of a surface and a subsurface of an optical element.

In order to accomplish the above object, the present invention adopts technical solutions as follows.

A device for simultaneously inspecting defects of a surface and a subsurface of an optical element comprises a laser excitation device, a laser interference inspection device, a laser scattering inspection device, a motion platform and a sample table, wherein:

the laser excitation device and the laser interference inspection device adopt lasers of different wavelengths;

the laser interference inspection device and the laser scattering inspection device adopt lasers of same wavelength;

the sample table is connected with the motion platform; and a sample to be tested is placed on the sample table; and the motion platform drives the sample to be tested to move in a three-dimensional space of X, Y and Z, so that a surface and a subsurface of the sample to be tested are scanned and inspected.

Preferably, the motion platform is a XYZ automatic displacement platform having an accurate position control ability.

Preferably, the laser excitation device comprises an exciting laser device, a scanning galvanometer, and a micro-objective with a long working distance, wherein:

the exciting laser device generates a pulsed exciting laser, wherein: a wavelength of the exciting laser is between 960-1160 nm; and a time-domain width of a minimum pulse is smaller than 1500 ps;

the scanning galvanometer deflects the exciting laser by a certain angle in a scanning plane, and the exciting laser is incident on the micro-objective with the long working distance in different angles;

a central point of a mirror of the scanning galvanometer is overlapped with an image focus of the micro-objective, so that the exciting laser, which is incident on the micro-objective in different angles, keeps parallel when being emergent; and an object focus of the micro-objective is on the surface of the sample to be tested.

Preferably, the laser interference inspection device comprises an inspection laser device, a Fabry-Perot resonant cavity, a dichroic mirror, an interference photoelectric detector, and an interference signal sampler, wherein:

the inspection laser device generates continuous inspection lasers, and a wavelength of the inspection lasers is between 490-580 nm, optimally 532 nm;

the Fabry-Perot resonant cavity comprises a collimating lens, a beam splitting prism, an interference prism, and a piezoelectric ceramic phase shifter;

the interference photoelectric detector is arranged on a wall of the Fabry-Perot resonant cavity; a detecting surface of the interference photoelectric detector is parallel with a surface of a mirror of the piezoelectric ceramic phase shifter, and the two surfaces are distributed at two sides of the interference prism; and the inspection laser after being emitted by the inspection laser device enters the Fabry-Perot resonant cavity; the beam splitting prism splits the inspection laser into two beams, wherein one beam is an interfering inspection laser, and the other beam is a scattering inspection laser; the interfering inspection laser is further split into two beams after passing through the interference prism, wherein one beam is a phase shifting laser, and the other beam is a detecting laser; the phase shifting laser is vertically incident on the piezoelectric ceramic phase shifter and then returns; the detecting laser is emergent through the Fabry-Perot resonant cavity, and then is reflected onto the surface of the sample to be tested by the dichroic mirror; the detecting laser, after being reflected by the surface of the sample to be tested, is reflected back to the interference prism by the dichroic mirror, and produces an interference with the phase shifting laser.

Preferably, the laser scattering inspection device comprises a mirror, a scattering collector, a reflecting collector, a scattering photoelectric detector, a reflecting photoelectric detector, a scattered light signal sampler and a reflected light signal sampler, wherein:

the scattering collector is an integrating sphere having five ports, wherein: a first port is for mounting the scattering photoelectric detector; a second port serves as an entrance port of the exciting laser; a third port serves as a sample inspection port; a fourth port serves as an entrance port of the scattering inspection laser; and a fifth port serves as an exit port of the scattering inspection laser;

the reflecting collector is an integrating sphere having two ports, wherein: one port is for mounting the reflecting photoelectric detector; and the other port serves as an entrance port of the scattering inspection laser; and the scattering inspection laser, after being reflected by the mirror of the laser scattering inspection device, enters the scattering collector through the entrance port of the scattering inspection laser and is obliquely incident on the surface of the sample to be tested; the laser reflected by the surface of the sample to be tested exits from the exit port of the scattering inspection laser, then enters the reflecting collector, and finally is captured by the reflecting photoelectric detector; the laser scattered by the surface of the sample to be tested is reflected multiple times inside the integrating sphere of scattering collector and is finally captured by the scattering photoelectric detector.

Preferably, for the scattering collector, the entrance port of the exciting laser and the sample inspection port are distributed at two sides of a center of the integrating sphere of scattering collector, and a connecting line between a center of the entrance port of the exciting laser and a center of the sample inspection port passes through the center of the integrating sphere; the entrance port of the scattering inspection laser and the exit port of the scattering inspection laser are in a conjugate distribution.

A method for simultaneously inspecting the defects of the surface and the subsurface of the optical element comprises steps of:

(1) turning on the exciting laser device and the inspection laser device, and warming up for a period of time, so that the exciting laser device and the inspection laser device work in a stable state;

(2) controlling the motion platform, so that the sample to be tested on the sample table moves in a up-down direction, and the object focus of the micro-objective with the long working distance is on the sample to be tested;

(3) controlling the inspection laser device to generate the inspection laser; recording scattered light signals collected by the scattered light signal sampler, and meanwhile recording reflected light signals collected by the reflected light signal sampler; calculating and acquiring an average amplitude $A_x$ of the scattered light signals and an average amplitude $A_r$ of the reflected light signals in a period of time;

(4) controlling the exciting laser device to generate the pulsed exciting laser, so that the exciting laser excites an acoustic surface wave on the sample to be tested; and meanwhile, triggering the interference signal sampler, the scattered light signal sampler and the reflected light signal sampler to record data;

(5) controlling a deflection angle of the scanning galvanometer, so that the exciting laser is incident on N different positions of the sample to be tested with a same interval; recording interference signals, scattered light signals and reflected light signals under influences of the acoustic surface waves excited at the different positions;

(6) analyzing an interference signal change at an $n^{th}$ position; determining an arrival time t of the acoustic surface wave; extracting the scattered light signals and the reflected light signals in a range of (t−Δt, t+Δt); calculating an average amplitude $A_s^p(n)$ of the extracted scattered light signals and an average amplitude $A_r^p(n)$ of the extracted reflected light signals;

with a formula of $$A_u = \sum_{n=1}^{N} [\text{abs}(A_s - A_s^p(n)) + \text{abs}(A_r - A_r^p(n))],$$

describing inspection results of subsurface defects at a current position; with a formula of $$A_v = \sum_{n=1}^{N} \text{abs}(A_s + A_r - A_s^p(n) - A_r^p(n)),$$

describing inspection results of surface defects at the current position; and (7) controlling the motion platform, so that the sample to be tested on the sample table moves in a left-right direction and a forward-backward direction; scanning and inspecting the sample to be tested in a specific area; and repeating above steps;

with position information of the scanning plane and an $A_u$ value corresponding to a specific position, conducting a visual description, and displaying subsurface scanning and inspection results of a current scanning area; with the position information of the scanning plane and an $A_v$ value corresponding to the specific position, conducting the visual description, and displaying surface scanning and inspection results of the current scanning area.

Compared with the prior art, the present invention has beneficial effects as follows.

Firstly, the present invention can simultaneously inspect the defects of the surface and the subsurface of the optical element and provide the intuitive defect distribution image through the scanning way.

Secondly, based on the acoustic surface wave excited by the exciting laser, the present invention modulates the scattering effects of the surface and the subsurface of the optical element, which improves the sensitivity of the scattering inspection and can effectively identify the defect positions.

DETAILED DESCRIPTION OF THE PREFERRED EMBODIMENT

The present invention is further described in detail with the accompanying drawings and the preferred embodiment.

According to the preferred embodiment of the present invention, a device and a method for simultaneously inspecting defects of a surface and a subsurface of an optical element are provided, which can be applied in quality inspection of optical elements, especially in finished product inspection of ultra-precise optical elements having strict requirements on subsurface defects.

Figure 1:
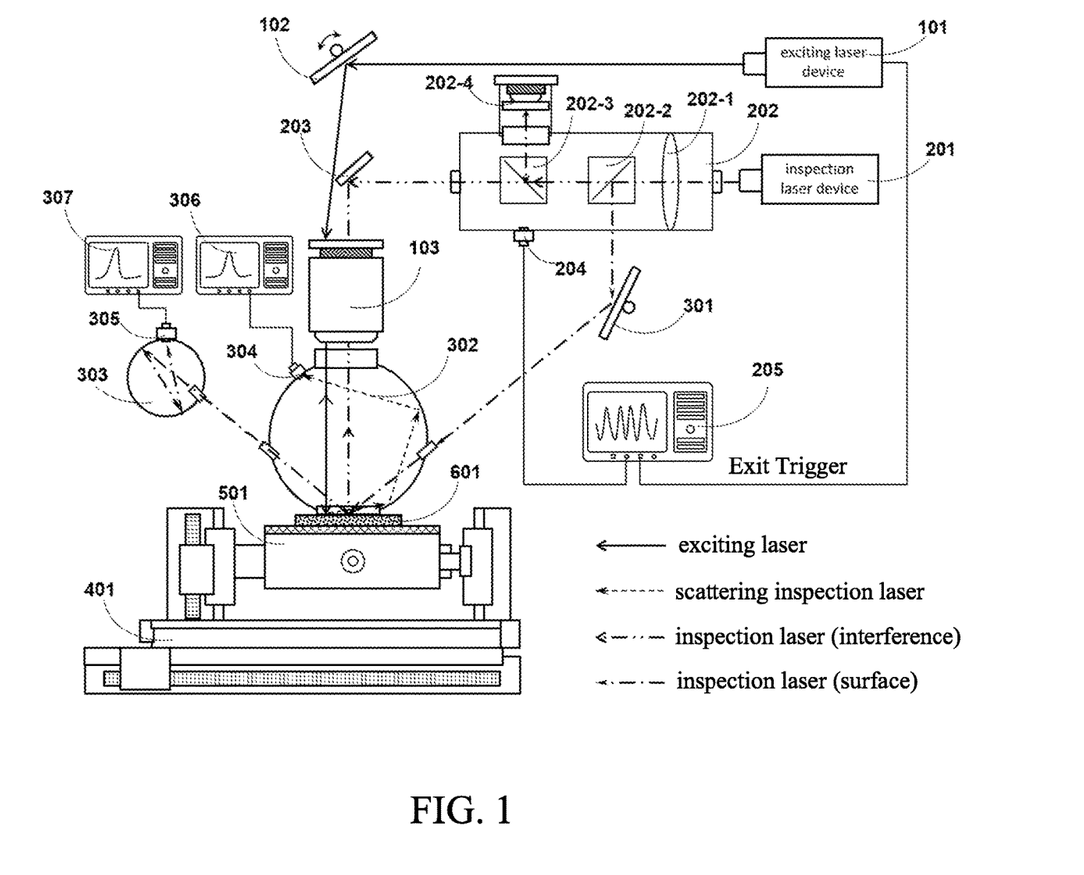
FIG. 1 is a structural sketch view of a device for simultaneously inspecting defects of a surface and a subsurface of an optical element according to a preferred embodiment of the present invention.

As shown in FIG. 1, the device for simultaneously inspecting the defects of the surface and the subsurface of the optical element comprises a laser excitation device, a laser interference inspection device, a laser scattering inspection device, a motion platform 401 and a sample table 501.

According to the preferred embodiment of the present invention, the laser excitation device and the laser interference inspection device adopt lasers of different wavelengths; the laser interference inspection device and the laser scattering inspection device adopt lasers of same wavelength.

According to the preferred embodiment of the present invention, the motion platform 401 is connected with the sample table 501; a sample 601 to be tested is placed on the sample table 501.

According to the preferred embodiment of the present invention, the motion platform 401 adopts a XYZ three-dimensional electric displacement platform with a grating feedback system, which can conduct an accurate position control. The motion platform 401 can drive the sample 601 to be tested to move in a three-dimensional space of X, Y and Z, so that a surface and a subsurface of the sample 601 to be tested are scanned and inspected.

According to the preferred embodiment of the present invention, the laser excitation device comprises an exciting laser device 101, a scanning galvanometer 102, and a micro-objective 103 with a long working distance. The exciting laser device 101 generates a pulsed exciting laser, wherein: a wavelength of the exciting laser is preferred to be 960-1160 nm; and a time-domain width of a minimum pulse is smaller than 1500 ps. In the preferred embodiment, the exciting laser with a wavelength of 1064 nm is selected. The scanning galvanometer 102 deflects the exciting laser by a certain angle in a scanning plane, and the exciting laser is incident on the micro-objective 103 with the long working distance in different angles. A central point of a mirror of the scanning galvanometer 102 is overlapped with an image focus of the micro-objective 103, so as to guarantee that the exciting laser, which is incident on the micro-objective 103 in different angles, will keep parallel with an axis of the micro-objective 103 when being emergent; an object focus of the micro-objective 103 is on the surface of the sample 601 to be tested.

According to the preferred embodiment of the present invention, the laser interference inspection device comprises an inspection laser device 201, a Fabry-Perot resonant cavity 202, a dichroic mirror 203, an interference photoelectric detector 204, and an interference signal sampler 205. The inspection laser device 201 generates continuous inspection lasers, and a wavelength of the inspection lasers is preferred to be 490-580 nm. In the preferred embodiment, the inspection laser with a wavelength of 532 nm is selected. The Fabry-Perot resonant cavity 202 comprises a collimating lens 202-1, a beam splitting prism 202-2, an interference prism 202-3, and a piezoelectric ceramic phase shifter 202-4. The interference photoelectric detector 204 is arranged on a wall of the Fabry-Perot resonant cavity 202; a detecting surface of the interference photoelectric detector 204 is parallel with a surface of a mirror of the piezoelectric ceramic phase shifter 202-4, and the two surfaces are distributed at two sides of the interference prism 202-3. The inspection laser after being emitted by the inspection laser device 201 firstly enters the Fabry-Perot resonant cavity 202. After passing through the collimating lens 202-1, the beam splitting prism 202-2 splits the inspection laser into two beams, wherein: one beam is an interfering inspection laser L1; and the other beam is a scattering inspection laser L2. The interfering inspection laser L1 is further split into two beams after passing through the interference prism 202-3, wherein: one beam is a phase shifting laser L1-1; and the other beam is a detecting laser L1-2. The phase shifting laser L1-1 is vertically incident on the piezoelectric ceramic phase shifter 202-4 and then returns, and the returned phase shifting laser is denoted as L1-1R. The detecting laser L1-2 is emergent through the Fabry-Perot resonant cavity 202, and then is reflected onto the surface of the sample 601 to be tested by the dichroic mirror 203. The detecting laser after being reflected by the surface of the sample 601 to be tested, denoted as L1-2R, is reflected back to the interference prism 202-3 by the dichroic mirror 203, and produces an interference with the returned phase shifting laser L1-R. A generated laser interference signal is sampled by the interference signal sampler 205, and a changing curve thereof is digitally displayed.

In the preferred embodiment, the laser scattering inspection device comprises a mirror 301, a scattering collector 302, a reflecting collector 303, a scattering photoelectric detector 304, a reflecting photoelectric detector 305, a scattered light signal sampler 306 and a reflected light signal sampler 307.

Figure 2A:
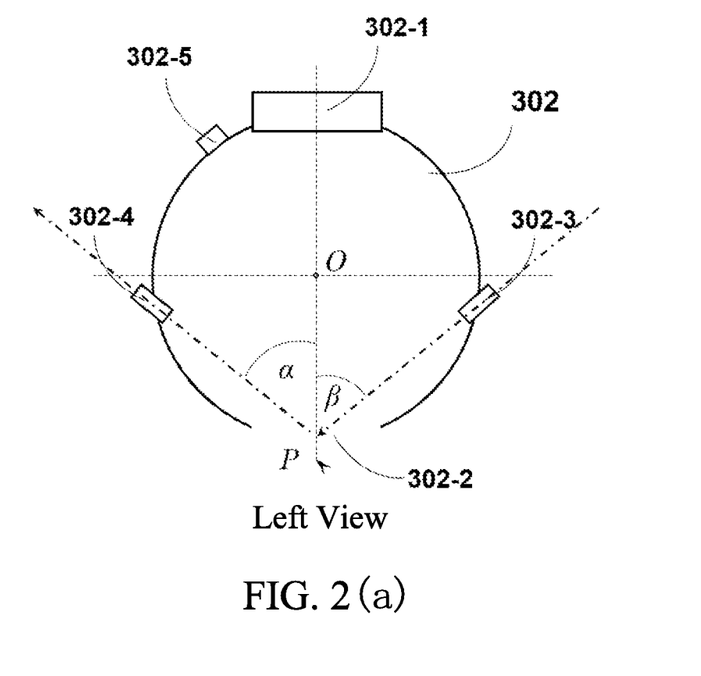
FIG. 2(a) is a left view of ports of a scattering collector according to the preferred embodiment of the present invention.
Figure 2B:
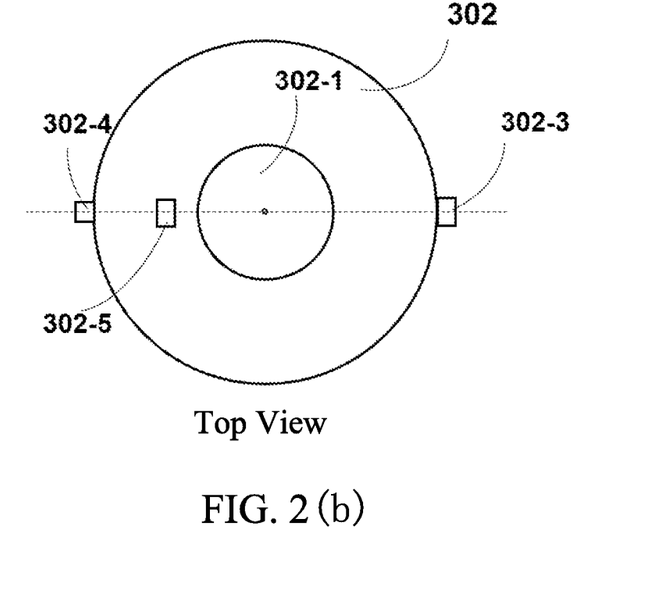
FIG. 2(b) is a top view of the ports of the scattering collector according to the preferred embodiment of the present invention.

As shown in FIG. 2(a) and FIG. 2(b), in the preferred embodiment, the scattering collector 302 is an integrating sphere having five ports, wherein: a first port 302-1 is an entrance port of the exciting laser; a second port 302-2 is a sample inspection port; a third port 302-3 is an entrance port of the scattering inspection laser; a fourth port 302-4 is an exit port of the scattering inspection laser; and a fifth port 302-5 is a port for mounting the scattering photoelectric detector 304. In the preferred embodiment, centers of the first port 302-1, the second port 302-2, the third port 302-3, the fourth port 302-4 and the fifth port 302-5 are coplanar with a center O of the integrating sphere 302. The first port 302-1 and the second port 302-2 are distributed at two sides of the center of the integrating sphere 302, and a connecting line between centers of the first port 302-1 and the second port 302-2 passes through the center O of the integrating sphere 302. The third port 302-3 and the fourth port 302-4 are symmetric about a straight line OP and are in a conjugate distribution.

In the preferred embodiment, the reflecting collector 303 is an integrating sphere having two ports, wherein: one port is for mounting the reflecting photoelectric detector 305; and the other port serves as an entrance port of the scattering inspection laser.

The scattering inspection laser L2, after being reflected by the mirror 301, enters the scattering collector 302 through the third port 302-3 and is obliquely incident on the surface of the sample 601 to be tested. The laser reflected by the surface of the sample 601 to be tested exits from the fourth port 302-4, then enters the reflecting collector 303, and finally is captured by the reflecting photoelectric detector 305. The laser scattered by the surface of the sample 601 to be tested is reflected multiple times inside the integrating sphere 302 and is finally captured by the scattering photoelectric detector 304.

Figure 3:
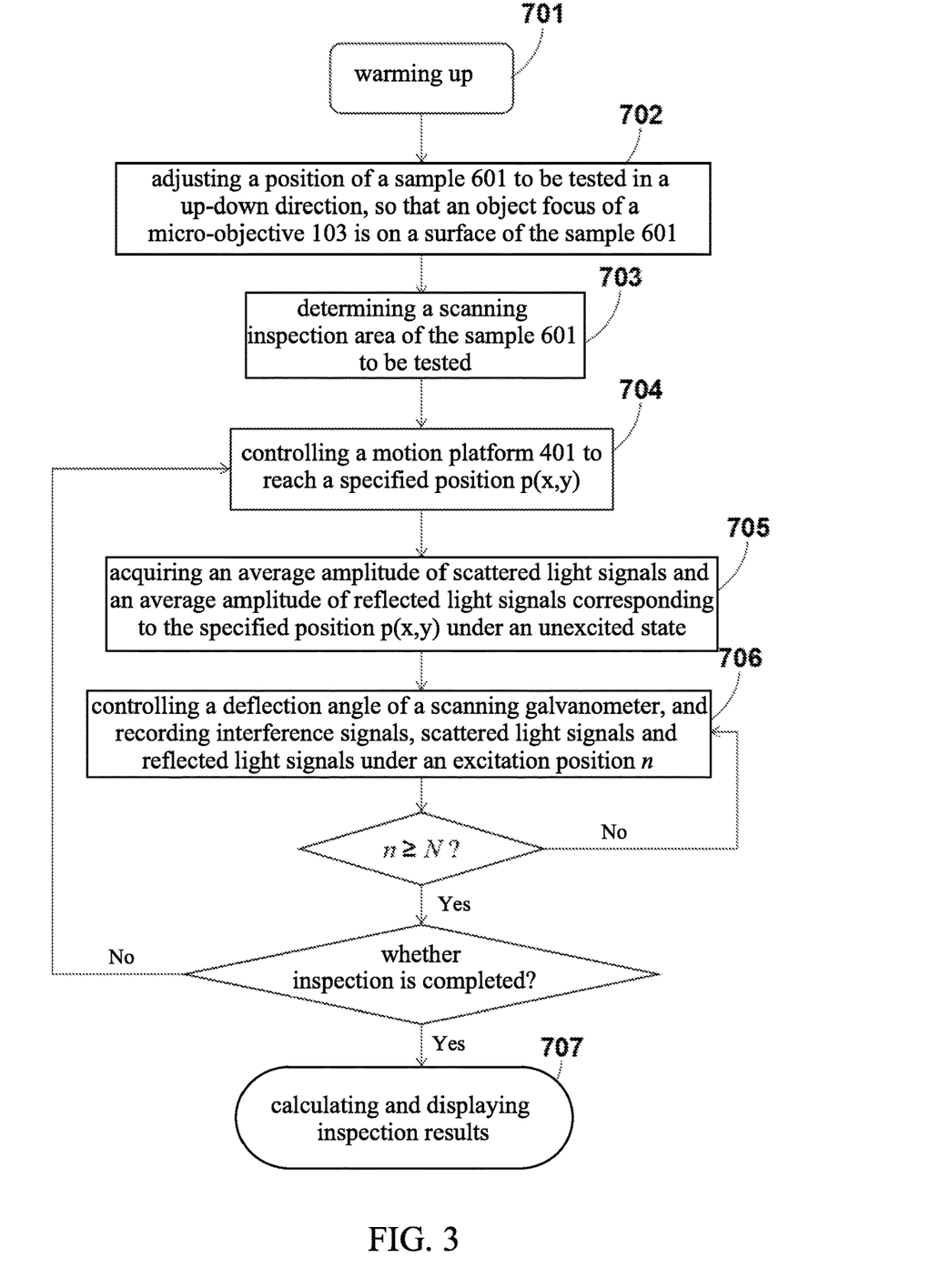
FIG. 3 is a flow diagram of a method for simultaneously inspecting the defects of the surface and the subsurface of the optical element according to the preferred embodiment of the present invention.

As shown in FIG. 3, the method for simultaneously inspecting the defects of the surface and the subsurface of the optical element comprises steps of:

(701) warming up, specifically comprising steps of: turning on the exciting laser device 101 and the inspection laser device 201, and warming up for a period of time, so that the exciting laser device 101 and the inspection laser device 201 work in a stable state;

(702) adjusting a position of the sample 601 to be tested, specifically comprising steps of: controlling the motion platform 401, so that the sample 601 to be tested moves in a up-down direction, and the object focus of the micro-objective 103 with the long working distance is on the surface of the sample 601 to be tested;

(703) determining a scanning inspection area of the sample 601 to be tested;

(704) controlling the motion platform 401 to reach a specified position p(x,y) to be inspected;

(705) acquiring an average amplitude of scattered light signals and an average amplitude of reflected light signals corresponding to the specified position p(x,y), specifically comprising steps of: controlling the inspection laser device 201 to generate the inspection laser; recording the scattered light signals collected by the scattered light signal sampler 306, and meanwhile recording the reflected light signals collected by the reflected light signal sampler 307; calculating and acquiring the average amplitude $A_s$ of the scattered light signals and the average amplitude $A_r$ of the reflected light signals in a period of time;

(706) controlling a deflection angle of the scanning galvanometer 102, and recording the interference signals, the scattered light signals and the reflected light signals under an excitation position n;

controlling the exciting laser device 101 to generate the pulsed exciting laser, so that the exciting laser excites an acoustic surface wave on the sample 601 to be tested; and meanwhile, triggering the interference signal sampler 205, the scattered light signal sampler 306 and the reflected light signal sampler 307 to record data;

at N different excitation positions, repeating the step of (706);

at different inspection positions, repeating the steps of (704)-(705); and (707) calculating and displaying inspection results.

In the preferred embodiment, the signal data recorded in the step of (706) is processed through steps of: analyzing an interference signal change at an $n^{th}$ position; determining an arrival time t of the acoustic surface wave; extracting the scattered light signals and the reflected light signals in a range of (t−Δt, t+Δt); calculating an average amplitude $A_s^P(n)$ of the extracted scattered light signals and an average amplitude $A_r^P(n)$ of the extracted reflected light signals.

The inspection results of the subsurface defects at the current position are described with a formula of $$A_u = \sum_{n=1}^{N} [\text{abs}(A_s - A_s^P(n)) + \text{abs}(A_r - A_r^P(n))];$$

and the describing inspection results of the surface defects at the current position are described with a formula of $$A_v = \sum_{n=1}^{N} \text{abs}(A_s + A_r - A_s^P(n) + A_r^P(n)).$$

With position information of the scanning plane and an $A_u$ value corresponding to the specified position, a visual description is conducted, and subsurface scanning and inspection results of the current scanning area are displayed. With the position information of the scanning plane and an $A_v$ value corresponding to the specified position, the visual description is conducted, and surface scanning and inspection results of the current scanning area are displayed.

In the preferred embodiment, digital sampling is carried out for a specific signal in a certain time t; if the number of the sampled discrete data points is m, the average amplitude of the signals is obtained through summing sampling values of the m discrete data points and then dividing by m.

Therefore, $A_s$ represents the average amplitude of the scattered light signals obtained without modulation of the acoustic surface wave; $A_r$ represents the average amplitude of the reflected light signals obtained without the modulation of the acoustic surface wave; $A_s^P(n)$ represents an $n^{th}$ average amplitude of the scattered light signals obtained with the modulation of the acoustic surface wave; $A_r^p(n)$ represents an $n^{th}$ average amplitude of the reflected light signals obtained with the modulation of the acoustic surface wave; with the average amplitude of the scattered light signals, the average amplitude $A_s$ of the scattered light signals and the average amplitude $A_r$ of the reflected light signals in a period of time are acquired; $A_u$ represents a quantified value of the inspection results of the subsurface defects at the current position; and $A_v$ represents a quantified value of the inspection results of the surface defects at the current position.

The above-described embodiment is only one preferred embodiment of the present invention and is not for limiting the present invention. Various changes and variations can be made by one of ordinary skill in the art without departing from the spirit and range of the present invention. Therefore, the technical solutions obtained through the equivalent replacements or equivalent transformations are all encompassed in the protection scope of the present invention.

What is claimed is:

1. A device for simultaneously inspecting defects of a surface and a subsurface of an optical element, comprising a laser excitation device, a laser interference inspection device, a laser scattering inspection device, a motion platform and a sample table, wherein:
   the laser excitation device and the laser interference inspection device adopt lasers of different wavelengths;
   the laser interference inspection device and the laser scattering inspection device adopt lasers of same wavelength;
   the sample table is connected with the motion platform; and a sample to be tested is placed on the sample table;
   the motion platform drives the sample to be tested to move in a three-dimensional space of X, Y and Z, so that a surface and a subsurface of the sample to be tested are scanned and inspected;
   the laser excitation device comprises an exciting laser device, a scanning galvanometer, and a micro-objective, wherein: the exciting laser device generates a pulsed exciting laser; the scanning galvanometer deflects the exciting laser by a certain angle in a scanning plane, and the exciting laser is incident on the micro-objective in different angles;
   the laser interference inspection device comprises an inspection laser device, a Fabry-Perot resonant cavity, a dichroic mirror, an interference photoelectric detector, and an interference signal sampler, wherein: the inspection laser device generates continuous inspection lasers; the Fabry-Perot resonant cavity comprises a collimating lens, a beam splitting prism, an interference prism, and a piezoelectric ceramic phase shifter; the interference photoelectric detector is arranged on a wall of the Fabry-Perot resonant cavity; a detecting surface of the interference photoelectric detector is parallel with a surface of a mirror of the piezoelectric ceramic phase shifter, and the two surfaces are distributed at two sides of the interference prism; and
   the inspection laser after being emitted by the inspection laser device enters the Fabry-Perot resonant cavity; the beam splitting prism splits the inspection laser into two beams, wherein one beam is an interfering inspection laser, and the other beam is a scattering inspection laser; the interfering inspection laser is further split into two beams after passing through the interference prism, wherein one beam is a phase shifting laser, and the other beam is a detecting laser; the phase shifting laser is vertically incident on the piezoelectric ceramic phase shifter and then returns; the detecting laser is emergent through the Fabry-Perot resonant cavity, and then is reflected onto the surface of the sample to be tested by the dichroic mirror; the detecting laser, after being reflected by the surface of the sample to be tested, is reflected back to the interference prism by the dichroic mirror, and produces an interference with the phase shifting laser.

2. The device, as recited in claim 1, wherein:
   a wavelength of the exciting laser is between 960-1160 nm; and a time-domain width of a minimum pulse is smaller than 1500 ps;
   a central point of a mirror of the scanning galvanometer is overlapped with an image focus of the micro-objective, so that the exciting laser, which is incident on the micro-objective in different angles, keeps parallel when being emergent; and
   an object focus of the micro-objective is on the surface of the sample to be tested.

3. The device, as recited in claim 2, wherein: a wavelength of the inspection laser is between 490-580 nm.

4. The device, as recited in claim 3, wherein:
   the laser scattering inspection device comprises a mirror, a scattering collector, a reflecting collector, a scattering photoelectric detector, a reflecting photoelectric detector, a scattered light signal sampler and a reflected light signal sampler;
   the scattering collector is an integrating sphere having five ports, wherein: a first port is for mounting the scattering photoelectric detector; a second port serves as an entrance port of the exciting laser; a third port serves as a sample inspection port; a fourth port serves as an entrance port of the scattering inspection laser; and a fifth port serves as an exit port of the scattering inspection laser;
   the reflecting collector is an integrating sphere having two ports, wherein: one port is for mounting the reflecting photoelectric detector; and the other port serves as an entrance port of the scattering inspection laser; and
   the scattering inspection laser, after being reflected by the mirror of the laser scattering inspection device, enters the scattering collector through the entrance port of the scattering inspection laser and is obliquely incident on the surface of the sample to be tested; the laser reflected by the surface of the sample to be tested exits from the exit port of the scattering inspection laser, then enters the reflecting collector, and finally is captured by the reflecting photoelectric detector; the laser scattered by the surface of the sample to be tested is reflected multiple times inside the integrating sphere of scattering collector and is finally captured by the scattering photoelectric detector.

5. The device, as recited in claim 4, wherein: for the scattering collector, the entrance port of the exciting laser and the sample inspection port are distributed at two sides of a center of the integrating sphere of scattering collector, and a connecting line between a center of the entrance port of the exciting laser and a center of the sample inspection port passes through the center of the integrating sphere; the entrance port of the scattering inspection laser and the exit port of the scattering inspection laser are in a conjugate distribution.

6. An implementation method of the device as recited in claim 5, comprising steps of:
   (1) turning on the exciting laser device and the inspection laser device, and warming up for a period of time, so that the exciting laser device and the inspection laser device work in a stable state;

(2) controlling the motion platform, so that the sample to be tested on the sample table moves in an up-down direction, and the object focus of the micro-objective is on the sample to be tested;

(3) controlling the inspection laser device to generate the inspection laser; recording scattered light signals collected by the scattered light signal sampler, and meanwhile recording reflected light signals collected by the reflected light signal sampler; calculating and acquiring an average amplitude $A_s$ of the scattered light signals and an average amplitude $A_r$ of the reflected light signals in a period of time;

(4) controlling the exciting laser device to generate the pulsed exciting laser, so that the exciting laser excites an acoustic surface wave on the sample to be tested; and meanwhile, triggering the interference signal sampler, the scattered light signal sampler and the reflected light signal sampler to record data;

(5) controlling a deflection angle of the scanning galvanometer, so that the exciting laser is incident on N different positions of the sample to be tested with a same interval; recording interference signals, scattered light signals and reflected light signals under influences of the acoustic surface waves excited at the different positions;

(6) analyzing an interference signal change at an $n^{th}$ position; determining an arrival time t of the acoustic surface wave; extracting the scattered light signals and the reflected light signals in a range of (t-Δt, t+Δt); calculating an average amplitude $A_x^P(n)$ of the extracted scattered light signals and an average amplitude $A_x^P(n)$ of the extracted reflected light signals; with a formula of $$A_u = \sum_{n=1}^{N} [\text{abs}(A_s - A_s^P(n)) + \text{abs}(A_r - A_r^P(n))],$$

describing inspection results of subsurface defects at a current position; with a formula of $$A_v = \sum_{n=1}^{N} \text{abs}(A_s + A_r - A_s^P(n) + A_r^P(n)),$$

describing inspection results of surface defects at the current position; and (7) controlling the motion platform, so that the sample to be tested on the sample table moves in a left-right direction and a forward-backward direction; scanning and inspecting the sample to be tested in a specific area; and repeating above steps;

wherein: with position information of the scanning plane and an $A_u$ value corresponding to a specific position, a visual description is conducted, and subsurface scanning and inspection results of a current scanning area are displayed; with the position information of the scanning plane and an $A_v$ value corresponding to the specific position, the visual description is conducted, and surface scanning and inspection results of the current scanning area are displayed; $A_s$ represents the average amplitude of the scattered light signals obtained without modulation of the acoustic surface wave; $A_r$ represents the average amplitude of the reflected light signals obtained without the modulation of the acoustic surface wave; $A_s^P(n)$ represents an $n^{th}$ average amplitude of the scattered light signals obtained with the modulation of the acoustic surface wave;

$A_r^P$ (n) represents an $n^{th}$ average amplitude of the reflected light signals obtained with the modulation of the acoustic surface wave; with the average amplitude of the scattered light signals, the average amplitude $A_s$ of the scattered light signals and the average amplitude $A_r$ of the reflected light signals in a period of time are acquired; $A_u$ represents a quantified value of the inspection results of the subsurface defects at the current position; and $A_v$ represents a quantified value of the inspection results of the surface defects at the current position.

* * * * *